March 4, 1947.  V. GREY  2,416,749

HOLLOW MILLING MACHINE

Filed March 15, 1943  4 Sheets-Sheet 1

INVENTOR
VICTOR GREY
BY
*H. B. Whitfield*
ATTORNEY

March 4, 1947.  V. GREY  2,416,749

HOLLOW MILLING MACHINE

Filed March 15, 1943  4 Sheets-Sheet 2

INVENTOR
VICTOR GREY
BY
ATTORNEY

March 4, 1947.  V. GREY  2,416,749
HOLLOW MILLING MACHINE
Filed March 15, 1943  4 Sheets-Sheet 3

INVENTOR
VICTOR GREY
BY
*H B Whitfield*
ATTORNEY

March 4, 1947.  V. GREY  2,416,749
HOLLOW MILLING MACHINE
Filed March 15, 1943  4 Sheets-Sheet 4
FIG. 9
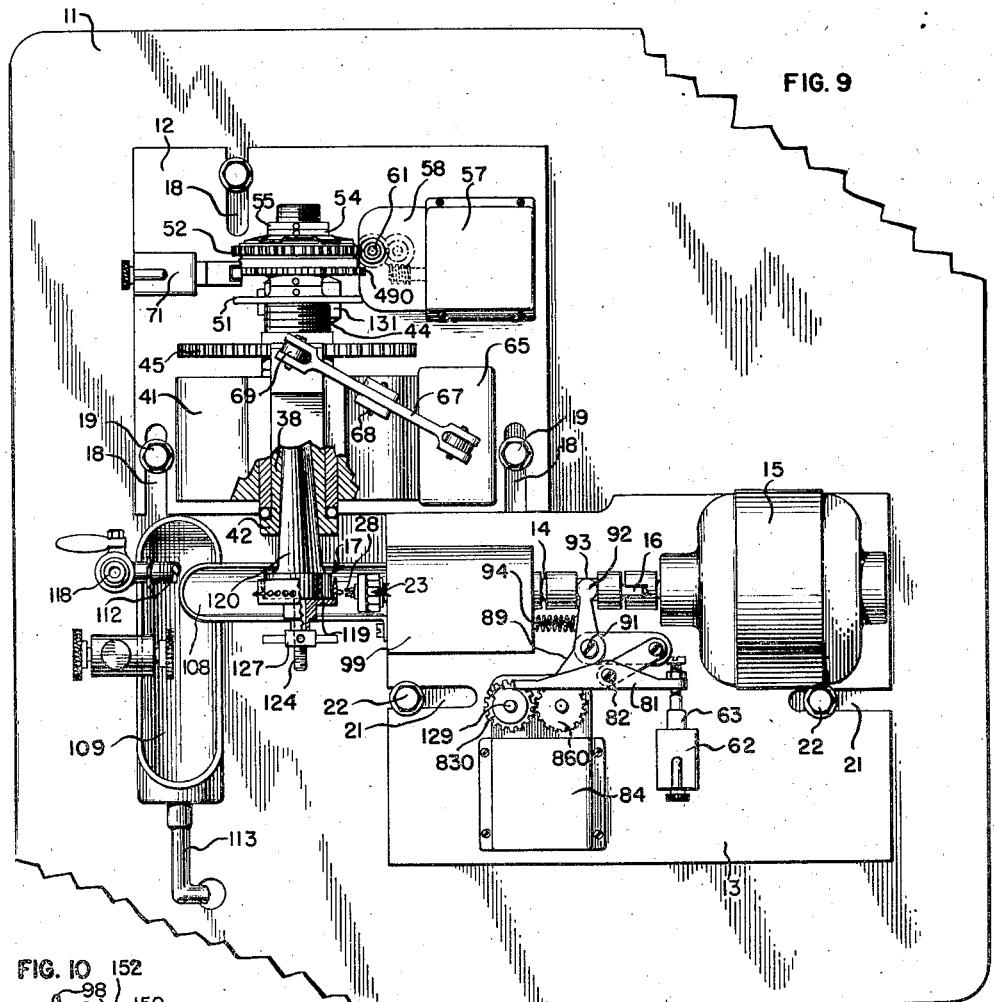
FIG. 10
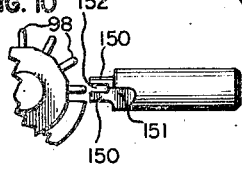
FIG. 11
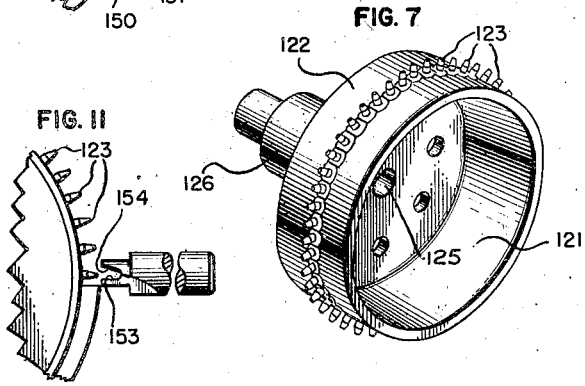
FIG. 7
FIG. 8
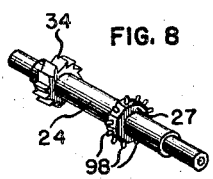
INVENTOR
VICTOR GREY
BY *J. H. B. Whitfield*
ATTORNEY Patented Mar. 4, 1947

2,416,749

UNITED STATES PATENT OFFICE 2,416,749

HOLLOW MILLING MACHINE

Victor Grey, Chicago, Ill., assignor to Teletype Corporation, Chicago, Ill., a corporation of Delaware Application March 15, 1943, Serial No. 479,230

1 Claim. (Cl. 90—14)

The present invention relates to automatic milling machines and more particularly to machines of this general class which are adapted to the production of several different automatic milling operations.

In various types of printing telegraph apparatus there are employed tape feed sprocket wheels having minute feed teeth or pins of special formation. These wheels are utilized for the advancement of control forms by propelling them through engagement with a longitudinal row of perforations provided centrally thereof. Consistent with particular requirements, the shape and number of the tape feed teeth on various types of sprocket wheels may vary as specific requirements indicate and accordingly it is herewith contemplated to provide an automatic hollow milling apparatus having an adjustable indexing device especially adaptable to the service of indexing a sprocket blank holding spindle so as to provide for predetermined variations in the number and formation of said sprocket teeth.

In the manufacture of telegraph apparatus, sprocket wheels of this class are most frequently integral with solid supporting shafts or with hollow shafts or sleeves. Accordingly means are provided, in association with the present invention, whereby several types of sprocket blank holding apparatus, designed to engage either sleeve or spindle sprocket wheel blanks, may be interchanged.

Accordingly the principal object of the present invention is to provide a milling machine for automatically and successively milling a plurality of peripheral sprocket feed teeth upon a cylindrical or disc blank with minimum supervision from the time that a piece part blank is inserted for processing until the final milling machining operations have been consummated.

In the attainment of the foregoing and other objects of the present invention, there have been utilized a number of electrical control devices which perform successively during the indexing and tool feeding operations which together comprise the steps of milling a number of peripherally disposed sprocket feed teeth in a cylindrical blank or wheel so that while the blank is undergoing a full revolution, a predetermined number of equally spaced tooth forming operations are completed and thereafter the indexing spindle as well as other control media are brought to rest. Thereupon, the operator or attendant removes the milled piece part from its holding jig or mandrel and replaces it with a blank piece part upon which the succession of milling operations are thereafter performed.

For a comprehensive understanding of the present invention reference will now be had to the following detailed specification and to the accompanying drawings wherein similar reference numerals designate corresponding parts throughout and in which, Fig. 1 is an electrical circuit diagram illustrating the several operating motors and supervisory control contacts incident to the electrical control system of the present invention;

Fig. 7 is a detailed perspective view of one type of sprocket wheel piece part whose feed teeth may be formed with the apparatus featured in Fig. 9;

Fig. 8 is a detailed perspective view of a sprocket feed wheel of the type that may be processed in accordance with the apparatus featured in Figs. 1 to 6, inclusive;

Fig. 9 is a plan view of the principal apparatus featured in Fig. 2 but modified by the addition of a different supporting spindle for processing a piece part such as that featured in Fig. 7 and having also a different type of gear ratio in connection with the supervisory control shafts;

Figure 1:
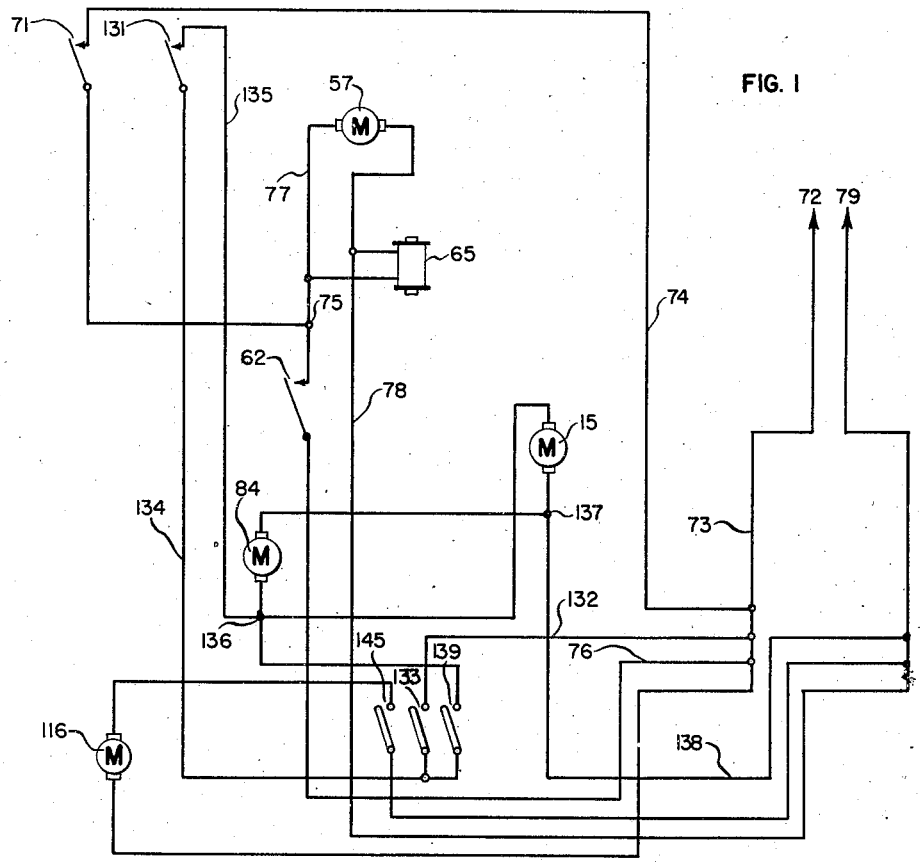

Fig. 10 is a fragmentary sectional detail view of one form of end mill cutter designed to produce sprocket wheel teeth of substantially cylindrical formation with semispherical turrets, and Fig. 11 is a fragmentary sectional detail view corresponding to that of Fig. 10 but featuring a modified end mill cutter construction for forming sprocket wheel teeth having cylindrical base portions and frusto-conical turrets.

Referring now more particularly to the accompanying drawings, the reference character 11 designates generally a table top of a principal supporting structure on the surface of which there are mounted two supporting blocks or bases designated 12 and 13. For convenient reference, the apparatus which is mounted upon the supporting block 12 will be generally referred to as the work indexing unit while that supported upon block 13 will be identified as the supervisory control unit. Journaled in a support of the supervisory control unit is a rotary shaft 14 which is continuously driven by the motor 15 through the instrumentality of a longitudinally displaceable tongue and groove coupling 16 that permits the advancement and retraction of shaft 14 to and from the locus of the work generally designated 17 in which the sprocket wheel blank is supported during the machining operation.

Figure 2:
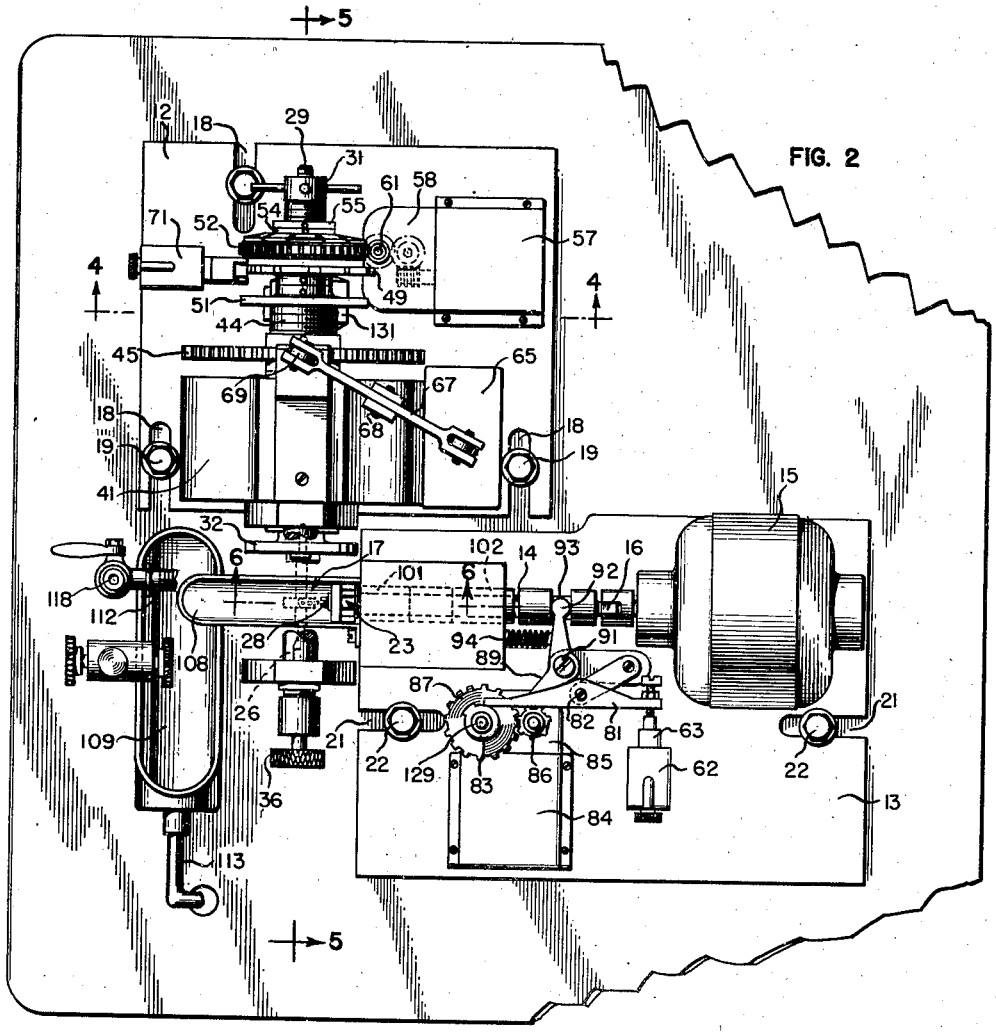
Fig. 2 is a plan view of the mechanical structure embodying certain features of the present invention.

The work indexing unit is supported upon its own base plate 12 which is provided with slots 18 parallel to each other so as to render the base plate adjustable upon the machine bed 11 in a direction parallel to the indexing spindle, Figs. 2 and 9. Upon proper placement, the base plate 12 is secured to the principal bed 11 by means of the tightening bolts 19 which are screw threaded into openings of the table top 11. In a similar manner, the base plate 13 of the supervisory control unit is correspondingly adjustable in a direction perpendicular to the indexing shaft axis of rotation but longitudinal to the axis of its own shaft, it being provided with slots 21 and corresponding tightening bolts 22. The regulation of block 12 is accordingly longitudinal of its indexing shaft 29 to enable the disposition of the sprocket feed blank longitudinally of its shaft, while adjustment of block 13 varies the depth of movement of the hollow mill holding shaft 14, and its integrally associated spindle chuck 23.

Figure 5:
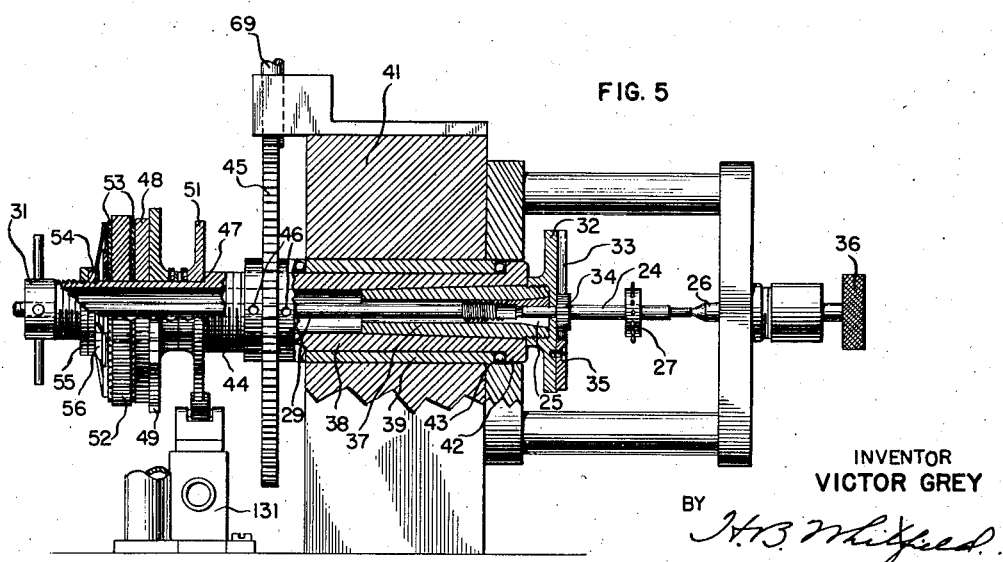
Fig. 5 is a longitudinal sectional view taken approximately on line 5—5 of Fig. 2 featuring the indexing shaft and supporting fixture for one type of sprocket feed wheel.

In accordance with a method of processing tape feed sprockets carried upon solid spindle shafts 24, which are of the type featured in Fig. 8, one end is secured within the clamping jaws of a collet 25, Fig. 5, while the other end, which is conically recessed, receives a conical center set screw 26 to secure it. Thus, support is afforded to both extremities of the shaft 24, as the sprocket wheel 27 is held in alignment with the axial center of the cutting tool 28, Figs. 2 and 6.

Figure 6:
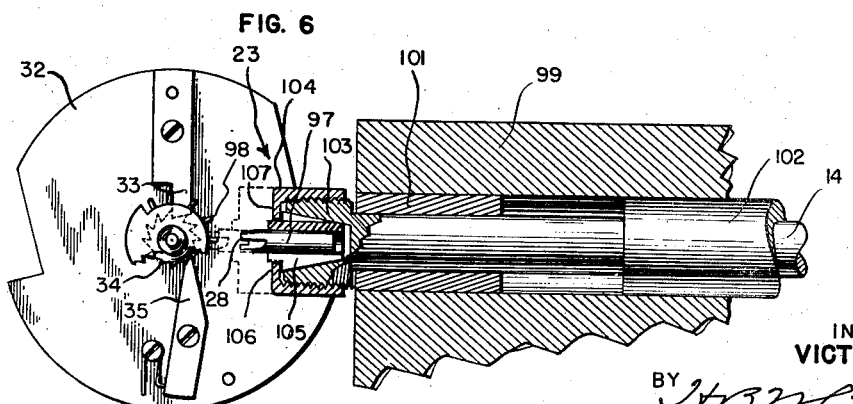
Fig. 6 is an enlarged sectional view taken approximately on line 6—6 of Fig. 2 and illustrating the tool holding chuck in two positions.

When inserting this type of piece part into the machine, the end of shaft 24 which is clamped is inserted into the locating plate 32, Fig. 6, so that the uppermost and rigid alignment tooth 33 is located within an intervening space between two of the teeth of a ratchet wheel 34 while a pivoted tooth is held by the operator against the tension of its spring in a clockwise position, Fig. 6.

Before the collet 25 is firmly constricted by drawing up the spoke nut 31, a spring loaded pivot tooth 35 is released to impart a clockwise rotation to the ratchet wheel 34 by impingement against an inclined surface of one of its teeth until the radial tooth surface of the diametrically opposite ratchet tooth comes into abutting relationship with the fixed locating plate tooth 33. The rigid and pivoted teeth of locating plate 32, described above, serve to align the workpiece 24 radially so that thereafter the sprocket feed teeth formed on disc 27 will have a definite relationship in radial disposition with respect to the ratchet wheel teeth of the ratchet wheel 34. After this alignment is thus established the longitudinal locating set screw 26 is turned in by a knurled head 36. The collet draw nut 31 is then tightened to cause collet 25 to firmly grasp the inwardly extending portion of the workpiece 24 as clearly illustrated in Fig. 5.

The collet 25 is contained within the tubular tapered sleeve 37 which has drive fitted relationship with the frictionally driven hollow indexing shaft 38, journaled in a bushing 39 of a principal supporting block 41 and provided with an end flange 42 for pressure against an end thrust bearing assembly designated as 43.

The hollow shaft 38 has a threaded portion 44 which receives a notched detent wheel 45, held in place thereon by threaded collars securable by set screws 46 so as to be integral with said shaft 38. At 47 the indexing shaft is reduced in diameter and between the shoulder afforded thereby and a fixed collar 48 are disposed two control discs generally designated 49 and 51. Disc 51 is provided with a single peripheral notch, as shown in Fig. 4, while disc 49 is provided with a number of peripheral notches in accordance with the particular piece of work to be processed. In the class of sprocket wheel manufacture, illustrated in Figs. 1 to 5, inclusive, there are contemplated twelve sprocket wheel teeth in wheel 27 so that accordingly there are provided twelve equally spaced peripheral notches in the control disc 49.

At the left of the plate or disc 48 there is a driven worm wheel 52 situated between two adjacent cork slip discs or washers 53 and an adjustment nut 54 supplemented by a check nut 55 serves through a tension spring disc 56 to apply end thrust pressure to frictionally confine the driven worm wheel 52 between its frictionally yielding driving discs 53.

Power for imparting rotation to the driven worm wheel 52 is obtained from a synchronous indexing motor 57, Figs. 2 and 4, which drives the vertical shaft 59 carrying the worm wheel 61 through a gear reduction box 58. Electrical supervision over indexing motor 57, which drives wheel 52, is had by a micro switch 62, Fig. 1. As may be noted from Fig. 1, the closure of contact pair 62 by a control cam 83 (Figs. 2 and 3) completes a circuit from power source which energizes not only the indexing motor 57 but also the index release magnet 65, which magnet in attracting its armature (not shown) moves pull rod 66 downwardly, Fig. 3, lever 67 to be rotated clockwise about its pivot 68, and accordingly detent bar 69 to be withdrawn from engagement within one of the notches of index wheel 45.

It will be noted from Fig. 1, that contact pair 62 is situated in electrical parallelism with another micro switch contact pair designated 71, so that upon the closure of either one of these pairs of contacts the circuit is completed from current source terminal 72 over conductor 73, thence either over branch conductor 74 and contact pair 71 to the junction point 75, or over the branch conductor 76 through contact pair 62 to the junction point 75. Thereafter the circuit is traceable over conductor 77 through the winding of magnet 65 and motor 57 in parallel, return wire 78 to the opposite current supply terminal 79.

Figure 3:
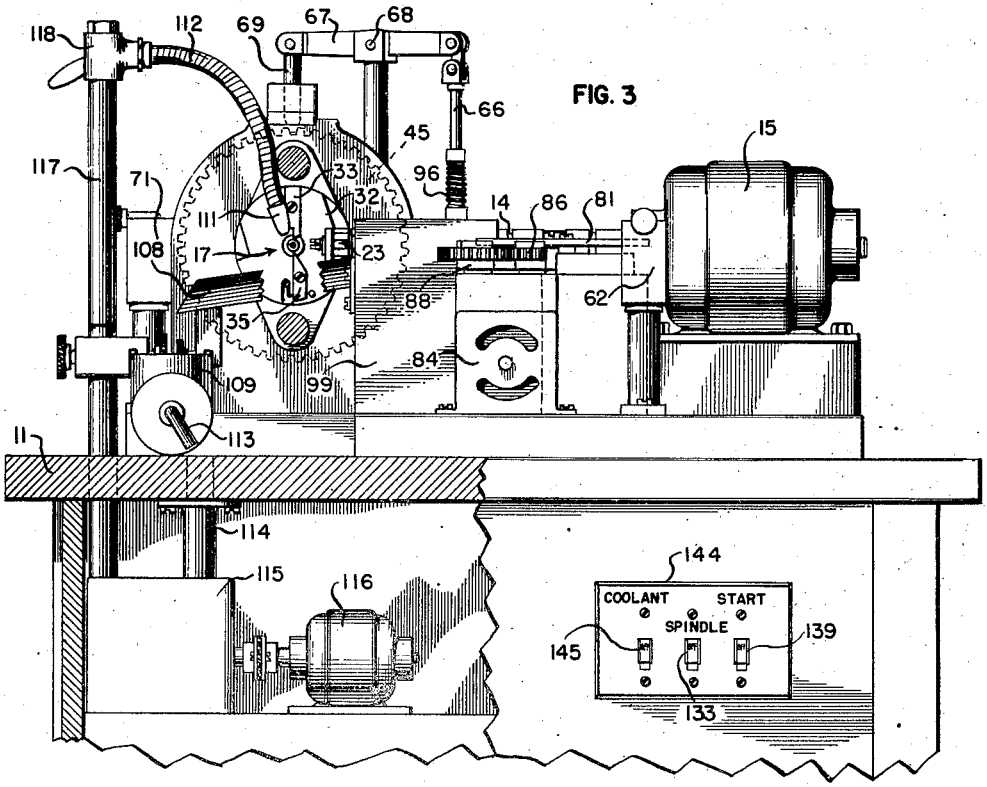
Fig. 3 is a slightly enlarged side elevational view of a portion of the apparatus featured in Fig. 2 with a portion of the supporting base partially in section.
Figure 4:
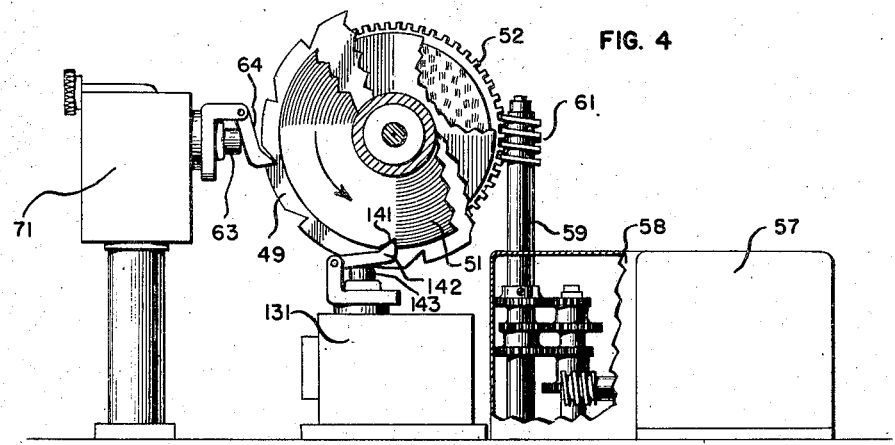
Fig. 4 is an enlarged detail sectional view taken approximately on line 4—4 of Fig. 2.

The starting impulse for closing the circuit is obtained upon the closure of contact pair 62 which performance is under the supervision of a lever 81 pivoted at 82 and controlled by the index supervisory cam 83 which is one of two supervisory cams rotated by the spindle feed motor 84, Figs. 1, 2, and 3. The spindle feed motor is integrally associated with a gear reduction box 85 through which power is supplied to the gear train comprised of gears 86 and 87. Beneath cam 83 and gear 87 as best revealed in Fig. 3, is another cam designated 88 having an involute profile and designed to be effective upon the adjacent arm of a bell crank member 89 pivoted at 91 (Fig. 2). The opposite arm of bell crank member 89 is bifurcated and each one of its arm tines is terminated with a disc 92 that dwells within an annular recess 93 in the enlarged portion of shaft 14. In accordance with the effect of cam 88, whose action is resisted by the compression spring 94, shaft 14 is thrust leftwardly or is permitted to return rightwardly as designated in dotted and solid outline, Fig. 6.

The uppermost cam 83, acting as it does upon lever 81, causes the closure of contact pair 62 at a precise interval during each revolution of cam shaft 129 coinciding with the advancement of the index wheel 45 as determined by the effect of cam 49 upon the micro switch 71, Fig. 4. As the cam 83 rotates counterclockwise, it repeatedly actuates lever arm 81 causing the contact pair 62 to be closed, energizing the withdrawal magnet 65 which frees the index ratchet wheel 45 and at the same time energizes index motor 57. The effective energizing pulse imparted by the cam 83 is of short duration, however, and as a consequence of the rotation of individual indexing cam 49 whose counterclockwise rotation from one dwell position, Fig. 4, to a succeeding one depresses button 63, there is closed the micro switch 71. As a result of the closure of switch 71, Fig. 1, the circuit which had been but momentarily completed by the contact pair 62 is maintained by the contact pair 71. Accordingly, motor 57 and magnet 65 will continue to be energized for the period contact pair 71 remains closed. This period will vary in accordance with the particular provisions of disc 49.

As contemplated in the showing of Figs. 1 to 5, inclusive, disc 49 is provided with twelve peripheral notches illustrated in Fig. 4. As each succeeding one of the notches encounters the follower arm 64 it permits the spring tensioned button 63 to dispose said arm as illustrated in this figure, and the contact pair 71 will then be permitted to open arresting the further operation of motor 57 and de-energizing relay 65. As a result of the de-energization of relay 65, spring 96, Fig. 3, will effectively restore the train of levers and rods 66, 67, to the position illustrated in Fig. 3 whereat the detent plunger 69 will settle into one of the notches of the master indexing disc 45 accurately locating shaft 38.

Thereafter and for the major portion of each cycle as indicated by the low area of cam 83, Fig. 2, the index shaft, Figs. 5 and 10, remains dormant and the milling shaft 14 is moved leftwardly, Fig. 2, by the action of cam 88, Fig. 3, upon bell crank 89. In consequence, the milling tool 97, Figs. 6 and 10, will shape a cylindrical tooth 98 with a semispherical turret on the sprocket wheel ridge 27 of the piece part and will thereafter recede back to its solid line position to await a succeeding index movement on the part of the index shaft.

This movement is initiated when the apex of cam 83 again encounters lever 81 closing the contact pair 62 and initiating the index cycle which is perpetuated by the closure of contact pair 71 as already described.

The journal block 99, see especially Fig. 6, is provided with two bearing sleeves 101 and 102 which support the milling shaft 14 for limited longitudinal and free rotary movement. At its chuck extremity, shaft 14 is somewhat enlarged and threaded as at 103, for receiving the octagonal chuck nut 104. The end of shaft 14 is bored internally to afford a conical recess of suitable taper to conform with that of a split collet 105. The collet 105 is shouldered as at 106 and thereat receives binding pressure from the end wall 107 of nut 104. When the nut 104 is drawn firmly in position the end thrust effect upon collet 105 causes the latter member to be constricted and to grip the milling tool 97 holding the latter member in integral relationship with the shaft 14.

The axial center of the milling machine shaft 14 is in horizontal alignment with the corresponding center of the indexing shaft, Fig. 6. Accordingly, all of the teeth 98 formed by the hollow milling tool 97 will therefore be radially disposed and will be spaced angularly about the wheel 27 in accordance with the adjustment provided by the indexing mechanism just described.

In placing the piece part 24, Fig. 6, into the locating plate 32, it will be recalled that its radial position is attained by the rotary effect of movable pawl 35 so that one of the teeth on sprocket wheel 34 comes into abutting engagement with the stationary locating plate dog designated 33. In this way, the formation of the sprocket wheel teeth 98 is accurately established with respect to the radial disposition of the ratchet wheel teeth 34.

Means have been provided as best illustrated in Figs. 2 and 3 for supplying a continuous stream of coolant to the piece part as it undergoes machining operation. For this purpose, a run-off trough 108 is disposed beneath the sprocket wheel 27 at an inclination so that its lowermost extremity is situated directly above a residue settling tank 109. Coolant discharged from the end of nozzle 111 of the flexible supply tube 112 may be directed onto the piece part undergoing milling operations and therefrom the coolant will flow downwardly into the catch trough 108 and be carried to the settling tank 109. From the latter reservoir the coolant fluid overflows through a conduit 113, Fig. 3, discharging through an opening in plate 11 into the receiving pipe 114 of a fluid circulating pump 115. The latter device may be of any type suitable in the service of circulating coolant fluid and is operated by an electric motor designated 116 in Figs. 1 and 3. The coolant fluid is forced upwardly through a supply pipe 117 and the volume of the stream may be regulated by adjusting the flow regulating cock 118.

The apparatus thus far disclosed is particularly adapted to the formation by milling of sprocket feed teeth on an apparatus having the general configuration as illustrated in Fig. 8 and designed to be provided with twelve equally spaced peripheral teeth 98 of cylindrical body formation with semispherical heads used in the step-by-step advancement of perforated tape in various types of printing telegraph apparatus. In the advancing of other classes of perforated control forms, various types of feed sprockets differing specifically from that described above may be encountered.

In Fig. 7 there is illustrated an example of a sprocket feed wheel in which the number of teeth exceeds that contemplated in Fig. 8 and to which there is provided no support such as the solid integral shaft of piece parts 24. It is to be noted, moreover, that the teeth provided in this embodiment are preferably formed with spherical lower shank portions and frusto-conical radial extremities or turret portions. There will now be described certain embodiments of a supporting fixture apparatus which may be applied to the principal device described above and thereby adapted to the holding of the piece part and operating of the indexing mechanism to accommodate the requirements of the modification, Fig. 7.

Referring now particularly to Fig. 9, attention is directed to the internally tapered driving sleeve or shaft 38 which is provided with the end thrust flange 42 as in the preferred adaptation. Into this member there is drive fitted a plug 120 so that the two rotate in unison. The plug 120 is shaped to afford an enlarged or head portion 119 which fits within the recess 121 of the sprocket feed wheel 122 shown in Fig. 7.

In the formation of the blank for making this type of apparatus, a central ridge, Fig. 11, is turned corresponding to the alignment of sprocket feed teeth 123. A threaded stub shaft 124 integral with the plug 120 extends through the opening 125 of integral collar formation 126. In order to secure the blanks firmly upon the holding plug 120, a tightening nut 127 is used having radial spindle arms to afford ample grip. Since there is provided no ratchet wheel associated with this type of feed sprocket, it is not essential to effect the accurate radial alignment of the blank as was the case with the first described embodiment.

Preferably forty-eight feed teeth 123 are formed in this type of workpiece so that accordingly the particular control disc utilized in this operation designated 490 is provided with forty-eight peripheral notches instead of but twelve as was the case in connection with the first embodiment control disc 49.

In addition to the foregoing change-over which consists in applying the modified control disc 490 and the solid plug holding device 120, it has been found expedient to increase the peripheral speed of the timing cams on shaft 129, since the material used in the manufacture of piece parts illustrated in Fig. 7 need not be of the hardness during processing as that of the piece part featured in Fig. 8. Accordingly, the driving gear 860 which receives its power from the motor 84 is preferably larger as compared with the driven gear 830 than in the case of the driving and driven gears 86 and 83 in Fig. 2.

Under both practices, it is desirable to execute a full revolution comprising either twelve or forty-eight separate machining operations on the peripheries of piece parts such as that indicated in Figs. 8 or 7 and thereafter to bring the indexing shaft, Fig. 5, to rest to await replacement by the operator. Accordingly, there has been provided a supervisory control switch 131 which is located in a circuit for energizing the milling machine spindle motor as well as the supervisory control motors 15 and 84, respectively. This circuit is traceable from one terminal 72, over lines 73 and 132, to a manual control switch 133 which is closed during the time that the machine is in operation, over line 134 through the contact pair 131, afore-mentioned, thence over line 135 to the junction point 136. From here the circuit is paralleled through the windings of motors 84 and 15 joining again at junction 137, thence over conductor 138 to the opposite power supply line 79.

In the circuit just traced, the contact pair 131 remains closed in order to supply operating current to the motors 15 and 84. As an alternative to contact pair 131, however, a manual start switch 139 is provided which bridges across and therefore parallels contact pair 131. The manual control switch is operated but momentarily by the operator after he has replaced the completed sprocket with a blank and as a result of the initial closure of the start circuit the spindle shaft begins to rotate carrying with it the primary disc 51, Fig. 4. As soon as the single notch 141 of this disc rides out of registration with the follower arm 142 of push button 143 which operates the contact switch 131, the latter continues to remain closed until this disc 51 has undergone a complete revolution and the notch 141 again registers with the follower 142 permitting the latter member to resume the position indicated in Fig. 4, and opening the start circuit of motors 15 and 84. Meanwhile, however, the operator will open switch 139 so that the break by disc 51 of the contact pair 131 will arrest current to the control motors.

It will be recalled that motor 84 exercises control over cam shaft 129 which carries the two supervisory cams 83 and 88. Accordingly, so long as motor 84 is idle, the machining tool motor 15 also being at the same time idle, there is effected the arrestment of the entire apparatus subject to restarting under supervision of manual control switch 139.

In Fig. 3 there will be noted a convenient control panel designated 144 through which there extends the manipulation handles for switches 133 and 139 already described, as well as of a further switch 145 which closes a local circuit for operating the coolant circulating motor 116. Under normal conditions of operation switches 133 and 145 remain closed but switch 139 is opened as soon as the spindle has been permitted to rotate a sufficient distance for notch 141 to ride out of range of the follower 142 as just described.

In the type of mill used in the formation of spherical terminating sprocket wheel teeth, the cutters are preferably two in number indicated 150, Fig. 10, and formed by milling out longitudinally as at 151 radially opposite quadrants with an intermediate profiled section 152 which resembles the sprocket tooth outlined as may be compared in this illustration. The end mills of the cutter featured in Fig. 11 differ from each other in one respect, notably that tooth 153 is provided with a longitudinal cutting edge paralleling the axis of rotation of the cutter while the other tooth is provided with a diagonal cutting edge 154 for forming the frusto-conical sprocket wheel tooth extremities as best indicated in Figs. 7 and 11.

Having described the present invention with reference to a particular embodiment, it will be noted that numerous modifications and variations may be had without departing from the essential spirit or scope thereof. Accordingly, it is not intended to be limited by the specific recitations in the foregoing detailed description nor by the particulars of the accompanying illustrations, except as indicated in the hereunto appended claim.

The invention claimed is:

In a control system for automatically milling circular work pieces, an indexing spindle comprising means for intermittently rotating a blank through predetermined angular distances, a pair of control discs carried on said spindle, one of said discs having a single peripheral notch and the other of said discs having a plurality of peripheral notches equal in number to the number of operations to be performed on the periphery of said work piece, an electrical circuit arrangement, contact means in said circuit for initiating milling operations, means effective pursuant to the operation of said contact means for controlling the regular recurrence of said milling operations comprising a switch, a cyclically operable cam for operating said switch, a master indexing device electrically controlled by said switch, and further electrical means controlled by said pair of control discs, whereby under the supervision of said notches in said pair of control discs said further electrical means is effective to control said means for controlling the regular recurrence of said milling operations.

VICTOR GREY.

REFERENCES CITED

The following references are of record in the file of this patent:

UNITED STATES PATENTS

| Number | Name | Date |
| --- | --- | --- |
| 396,796 | Zimmerman | Jan. 29, 1889 |
| 1,822,730 | Frederick et al. | Sept. 8, 1931 |
| 1,036,720 | Robinson | Aug. 27, 1912 |
| 1,260,271 | Kramer | Mar. 19, 1918 |
| 2,290,590 | Hawley et al. | July 21, 1942 |
| 457,719 | Hillman | Aug. 11, 1891 |
| 1,110,274 | Sponable | Sept. 8, 1914 |